United States Patent [19]

Watanabe

[11] Patent Number: 4,623,900
[45] Date of Patent: Nov. 18, 1986

[54] IMAGE BUILDING APPARATUS

[75] Inventor: Junji Watanabe, Yokohama, Japan

[73] Assignee: Kabushiki Kaisha Toshiba, Japan

[21] Appl. No.: 673,847

[22] Filed: Nov. 21, 1984

[30] Foreign Application Priority Data

Nov. 22, 1983 [JP] Japan ................. 58-219716

[51] Int. Cl.⁴ ............................................ G01D 15/10
[52] U.S. Cl. ................. 346/76 PH; 346/136; 355/26; 400/188; 271/225
[58] Field of Search ............... 346/76 PH, 76 R, 136; 355/23–24, 26; 250/314; 271/186, 225, 303, 304, 65, DIG. 9; 101/230, 231; 400/120, 188, 624–629; 219/216 PH

[56] References Cited

U.S. PATENT DOCUMENTS 3,869,202 3/1975 Tabata et al. ............... 271/65
4,186,662 2/1980 Borneman ................. 101/235

FOREIGN PATENT DOCUMENTS

0098033 1/1984 European Pat. Off. ....... 346/76 PH

Primary Examiner—A. Evans
Attorney, Agent, or Firm—Finnegan, Henderson, Farabow, Garrett & Dunner

[57] ABSTRACT

An improve image building apparatus is disclosed which makes it possible to carry out image transferrence to both the surfaces of material by bringing back material while its rear end moves ahead and displacing it to an image transferring section from first guiding means after it is displaced from first guiding means to second guiding means via the image transferring section after image transferrence is completed on the one surface of material. The first and second guiding means are extended in parallel with a discharging tray by way of which image transferred material is displaced away from the apparatus and they serve to guide reciprocable movement of the material through the image transferring section when superimposing image transferrence should be carried out.

10 Claims, 12 Drawing Figures

IMAGE BUILDING APPARATUS

BACKGROUND OF THE INVENTION

1. Field of the Invention

The present invention relates to a transfer type image building apparatus in which an image is built on material such as copying paper or the like by transferring a coloring agent to the surface of material and, more particularly, to an improvement of or relating to an image building apparatus of the type including guiding means for the purpose of guiding material adapted to reciprocably move through a transferring section to carry out superimposing transferrence, wherein the apparatus makes it possible to carry out transferrence to both surfaces of the material in spite of simple structure.

2. Description of the Prior Art

A thermal transfer type image building apparatus is well known as transfer type image building apparatus in which an image is built on material such as copying paper or other printing medium by transferring a coloring agent to the surface of material. As characterizing features of thermal transfer type image building apparatus that it is small in dimension and inexpensive in manufacturing cost, it generates less noise and any type of plain paper can be used as material to which coloring agent is to be transferred are increasingly recognized, it is being widely put in practical use not only for the purpose of recording output from a word processor, computor or the like but also as a copying machine in recent years.

This type of image building apparatus is usually constructed such that paper is delivered to the area as defined between a platen and a thermal head and the latter is then brought in pressure contact with the platen with an ink ribbon interposed therebetween so that an image is transferred to the surface of paper. In recent years a modified type of image building apparatus has been developed which assures superimposing transferrence by allowing the paper to reciprocably move relative to the thermal head. Further, another modified type of image building apparatus has been developed which assures not only superimposing transferrence but also image transferrence to both the surfaces of the paper.

The conventional image building apparatus which makes it possible to carry out both superimposing transferrence and image transferrence to both surfaces of the paper is generally constructed such that on completion of superimposing transferrence to one surface of the paper the latter is delivered to a paper upsetting passage arranged specially in the housing of the apparatus and upset paper is brought back to the thermal head so as to carry out image transferrence to the other surface of the paper. However, it has been found that the conventional image building apparatus has drawbacks that due to the special arrangement of the paper upsetting passage in the housing, the apparatus is complicated in structure and expensive in manufacturing cost and it takes a long time until the paper is upset in the passage because the latter has a long length.

SUMMARY OF THE INVENTION

Thus, the present invention has been made with the foregoing drawbacks in mind.

It is an object of the invention to provide an improved image building apparatus which assure that image transferrence is carried out to both surfaces of the paper without necessity for any particularly arranged paper upsetting passage in spite of the fact that the apparatus is simple in structure.

According to the invention, material such as copying paper or the like to which image transferrence has been completed on one surface is upset with the aid of guiding means adapted to guide reciprocable movement of the paper when superimposing transferrence should be carried out. Specifically, the invention consists in an image building apparatus of the type in which superimposing transferring is effected by allowing paper to reciprocably move between first and second guiding means through a transferrence section, wherein the apparatus includes paper feeding means adapted to bring image transferred paper to the transferring section from the first guiding means when image transferrence should be carried out to the other surface of the paper which has been displaced to the second guiding means after completion of image transferrence to the one surface thereof, bringing of the image transferred paper to the transferring section being effected while the rear end of paper moves ahead.

Further, according to the invention the first and second guiding means are extended in parallel with a paper discharging tray by way of which image transferred paper is discharged away from the apparatus and they can be attached to a housing of the apparatus and removed from the same together with the discharging tray.

Owing to the arrangement of the apparatus made in that way there is no necessity for a special paper upsetting passage and thereby it is possible to construct the apparatus more simple, inexpensive and smaller. Moreover, since the time required for upsetting operation can be shortened, it results that the time required for image transferrence to both surfaces of the paper is substantially reduced.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which illustrate a preferred embodiment thereof.

Figure 1:
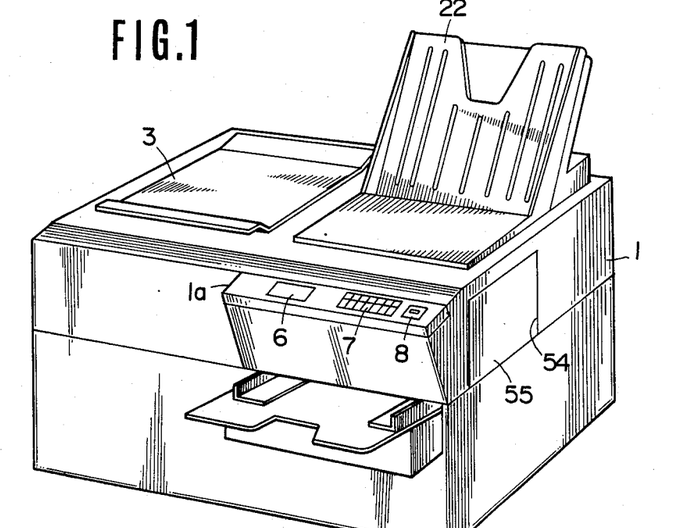
FIG. 1 is a perspective view of an image building apparatus in accordance with an embodiment of the invention, illustrating the whole appearance of the apparatus.
Figure 2:
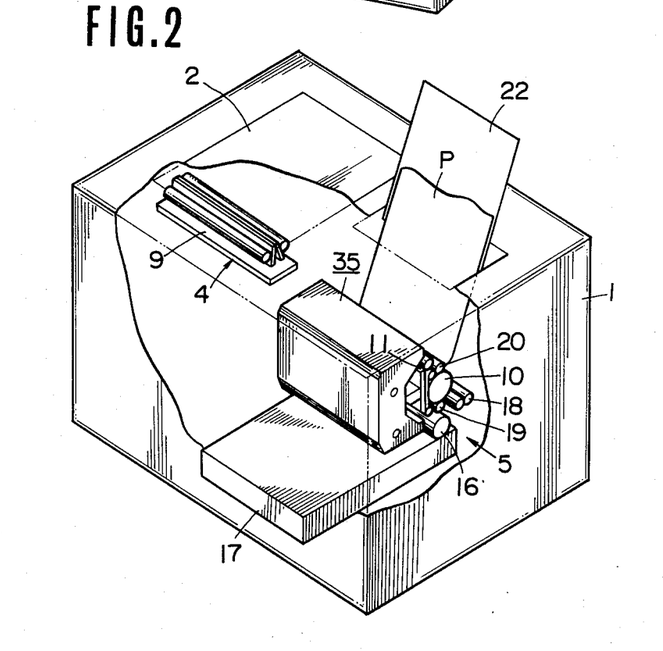
FIG. 2 is a partially cut-away perspective view of the apparatus in FIG. 1.

FIG. 1 is a perspective view of an image building apparatus according to the invention which illustrates the whole appearance of the same and FIG. 2 is a partially cutaway perspective view of the apparatus which schematically illustrates the structure of the same. In FIGS. 1 and 2 reference numeral 1 designates a housing of the apparatus and the latter is provided with a control board 1a on the upper part of the front wall of the housing 1. Further, the apparatus is provided with an original table 2 on the upper surface of the housing 1 and an original depressing cover 3 is disposed at the lefthand part of the original table 2. An original scanning section 4 (scanner section) for scanning an original which has been set on the original table 2 is arranged in the housing 1 at the position located below the original table 2, whereas an image building section 5 (printer section) is arranged in the housing 1 at the righthand side thereof.

The control board 1a includes a copying number determining section 7 comprising a display 6, a ten key 7 and others and moreover it includes a button 8 and they are arranged on the control board 1a in a predetermined order as illustrated in the drawing. As is apparent from FIG. 2, the original scanning section 4 is constructed such that an original on the original table 2 is optically scanned by a movable scanning portion 9 constituting the exposure optical system, which reciprocably moves along the lower surface of the original table 2. Optical information thus produced is photoelectrically converted so that it is inputted into the image building section 5.

Figure 3:
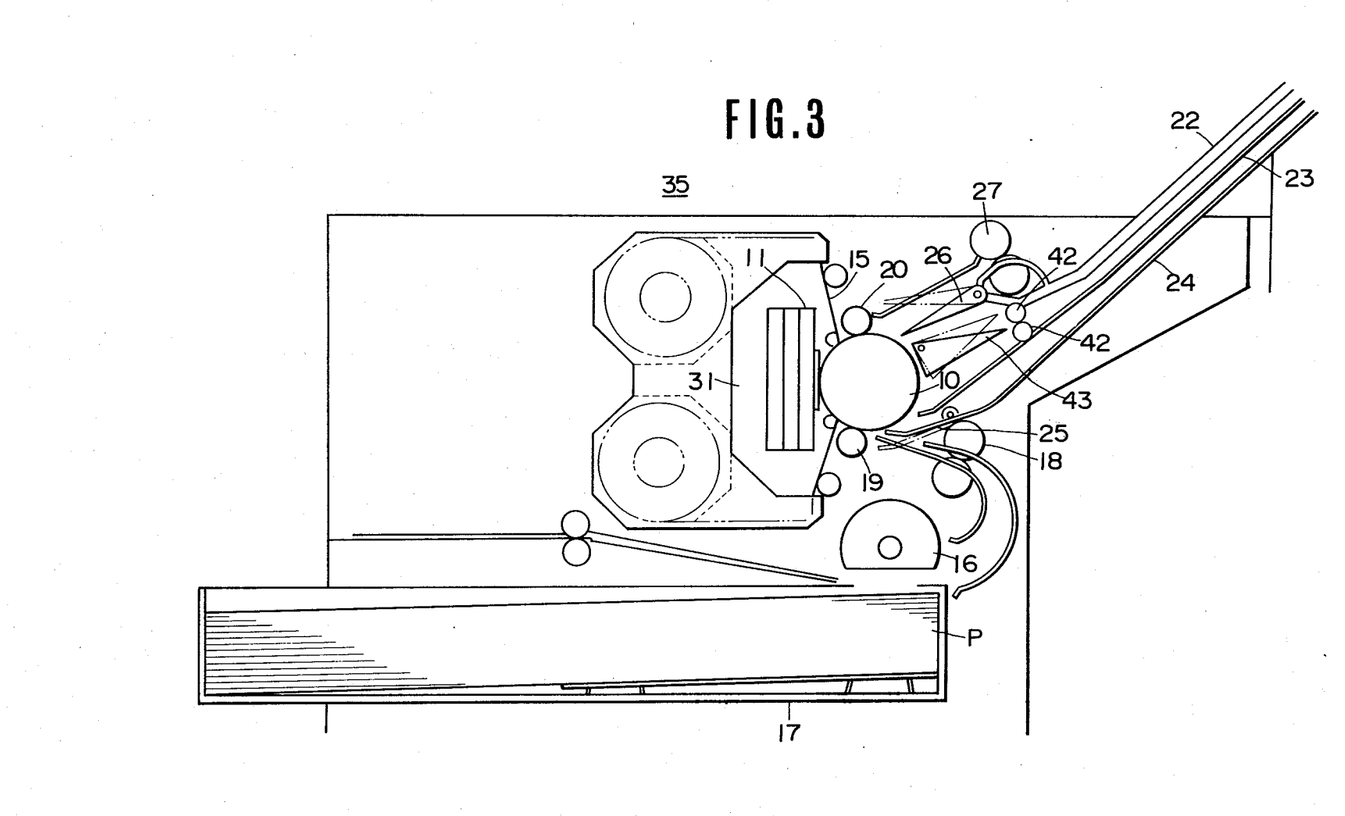
FIG. 3 is a schematic vertical sectional view of the apparatus.

The image building section 5 is constructed as illustrated in FIGS. 2 and 3. Specifically, the image building section 5 has a platen 10 disposed at the substantially central part thereof and a thermal head 11 serving as recording head is provided in front of the platen 10 (at the position located leftwardly of the latter as seen in FIG. 3) in such a manner as to come in contact with it and out of contact therefrom.

Further, a thermal transferring ribbon 15 (ink ribbon) serving as transferring means is interposed between the thermal head 11 and the platen 10. As a copying paper P is thrust against the platen 10 with the thermal transferring ribbon 15 held therebetween and heating elements (not shown) arranged in the line-dot shaped configuration on the thermal head 11 are turned on in response to image information which has been transmitted from the scanning section 5, coloring agent (ink) on the thermal transferring ribon 15 is caused to melt under the effect of elevated temperature and molten coloring agent is transferred to paper P.

A paper feeding roller 16 is disposed at the position located downwardly of the platen 10 so that papers P accomodated in a paper feeding cassette 16 are taken out of the latter one by one. After one paper P is taken therefrom, it is received by a pair of register rollers 18 located upwardly of the paper feeding roller 16 on the righthand side so that its foremost end part is correctly oriented. It is then displaced toward the platen 10 until it is wound around the platen with the aid of thrusting rollers 19 and 20.

Figure 4:
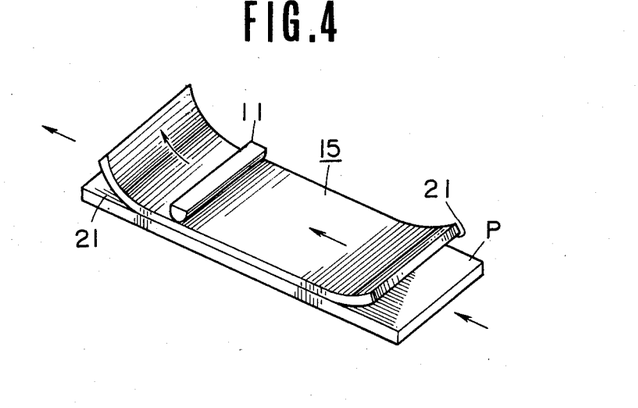
FIG. 4 is a perspective view schematically illustrating how image transferrence is carried out to paper.

On the other hand, the thermal head 11 is thrusting paper P against the platen 10 with the thermal transferring ribbon 15 held therebetween as illustrated in FIG. 4 whereby ink 21 on the thermal transferring ribbon 15 serving as a coloring agent is caused to melt under the effect of elevated temperature so that it is transferred to paper P.

Figure 5:
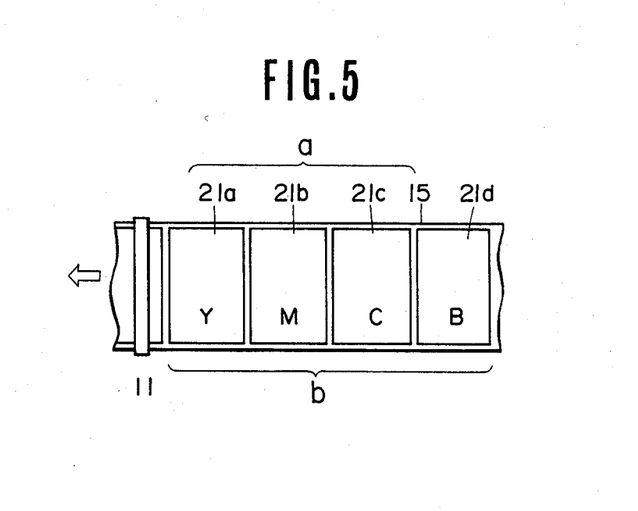
FIG. 5 is a plan view of a thermal transferring ribbon illustrating how ink is transferred to paper.

As illustrated in the area a in FIG. 5, the thermal transferring ribbon 15 is dimensioned in width substantially same to the width of paper P and includes three ink sections 21a, 21b and 21c for yellow (Y), magenta (M) and cyan (C) or it does four ink sections 21a, 21b, 21c and 21d for yellow (Y), magenta (M), cyan (C) and black (B) as illustrated in the area b in the drawing. At every time when each of the inks is transferred to paper P, the thermal head 11 is restored to the original position so that correct superimposing is carried out.

It should be noted that thermal transferring ribbon including a black ink section 21d is preferably employed when black color is required to appear clearly on paper but it is possible to produce color very close to black by way of superimposing three colors one above another without necessity for the black ink section 21d.

To carry out color superimposing it is necessary to reciprocably displace paper P by the same number as that of colors by rotating the platen 10. During reciprocable movement of paper P the latter is brought to first and second guides 23 and 24 both of which are extended along the paper discharging tray 22.

Now, description will be made below as to usage of the first and second guides 23 and 24 with reference to FIGS. 6(A) to (D).

Figures 6A, 6B:
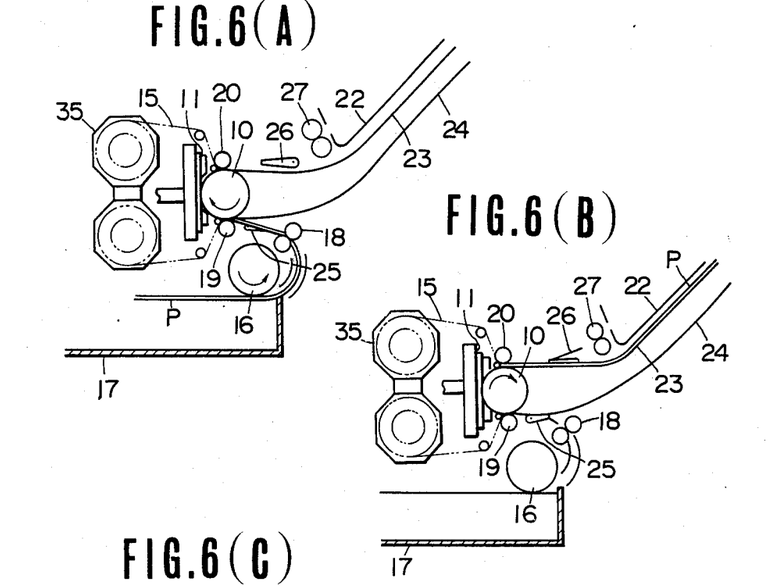
FIGS. 6(A), 6(B), 6(C), to 6(D) are fragmental sectional side views of the apparatus schematically illustrating how paper is displaced in the apparatus when multi-color transferrence should be carried out.

First, paper P taken from the paper feeding cassette 17 is delivered to the platen 10 via a pair of register rollers 18 and a first distributing guide 25 until it is wound around the platen 10 (see FIG. 6(A)).

Next, the platen 10 is rotated by means of a pulse motor which is not shown in the drawings so as to displace paper P in the required direction. At the same time heating elements (not shown) arranged on the thermal head 11 in the line-dot shaped configuration in the axial direction of the platen 10 are turned on in response to image information whereby ink 21 on the thermal transferring ribbon 15 is transferred to paper P.

The foremost end part of paper P which has passed by the platen 10 is then displaced onto the first guide 23 extending below the paper discharging tray 22 with the aid of a second distributing guide 26 (see FIG. 6(B)).

Paper P onto which ink 21 having a certain color has been transferred in that way is reversely displaced by rotating the platen 10 in the opposite direction and it is delivered onto the second guide 24 located below the first guide 23 via the first distributing guide 25 which is dislocated from the foregoing positon by its turning movement (see FIG. 6(C)).

Multi-color superimposing is accomplished by reciprocably displacing paper P by plural times by way of the above-mentioned steps.

Figures 6C, 6D:
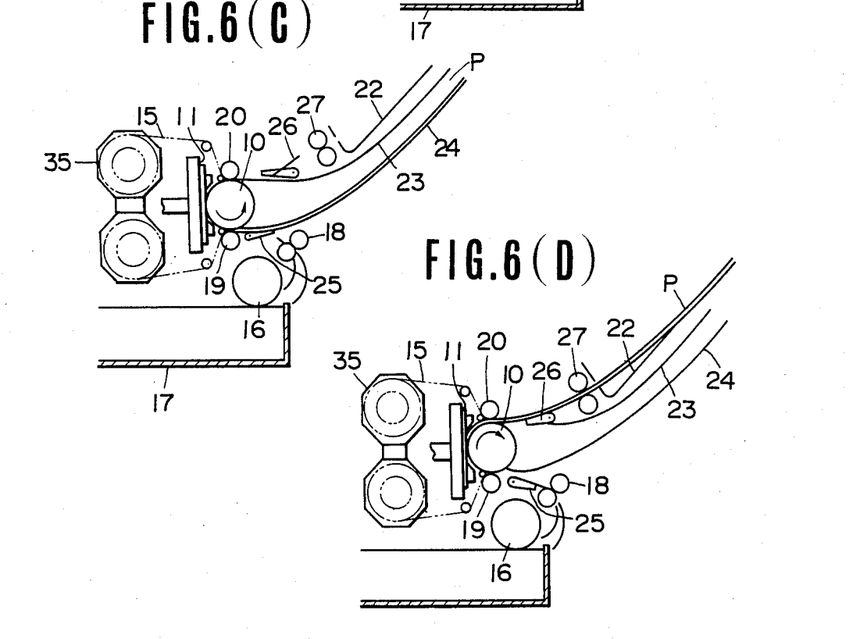

After completion of transferring of all colors carried by ink 21 paper P is brought to a pair of paper discharging rollers 27 by means of the second distributing guide 26 and it is then displaced onto the paper discharging tray 22 (see FIG. 6(D)).

Figure 7:
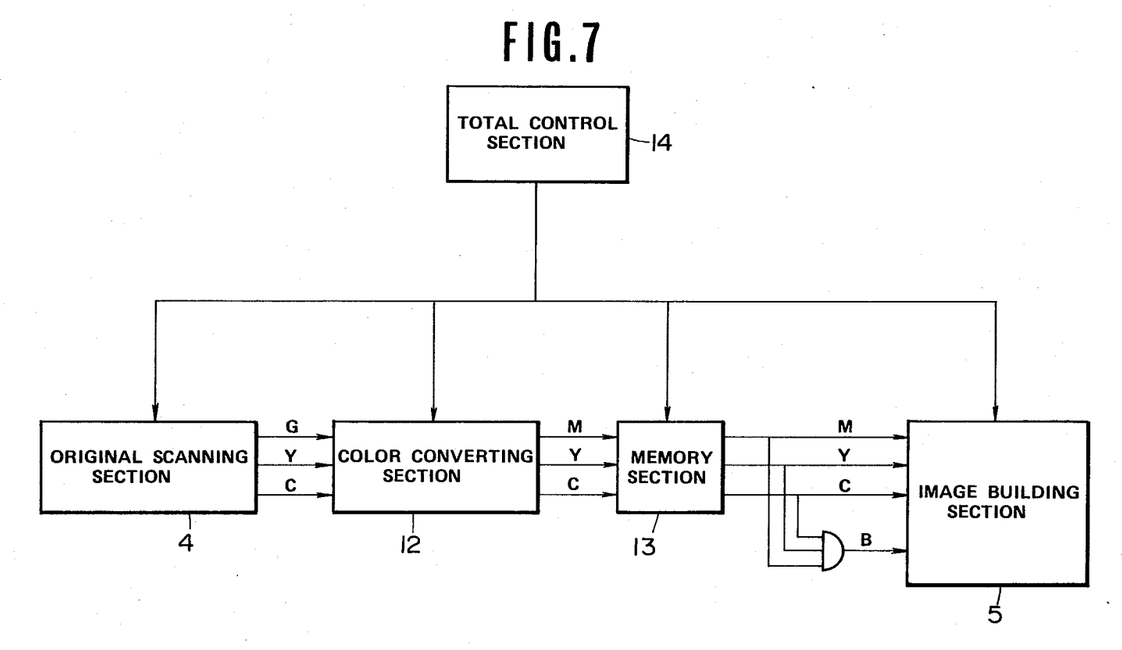
FIG. 7 is a block diagram illustrating the arrangement of essential components for the apparatus.

As is apparent from FIG. 7, the image building apparatus of the invention includes an original scanning section 4, a color converting section 12, a memory section 13, an image building section 5 and a total control section 14.

The value of each of color components comprising green (G), yellow (Y) and cyan (C) detected by the original scanning section 4 is color converted to magenta (M), yellow (Y) and cyan (C) constituting coloring medium in printing operation with the aid of the color converting section 12 and thus the color converted value is stored in the memory section 13 with respect to each of colors together with information concerning the position on an original. The image building section 5 is then operated on the base of the value which is read from the memory section 13 so as to transfer to paper P coloring medium of magenta (M), yellow (Y), cyan (C) and black (B) (It should be noted that black is represented by AND output obtained from magenta (M), yellow (Y) and cyan (C)). The total control section 14 is adapted to control all of the original scanning section 4, the color converting section 12, the memory section 13 and the image building section 5.

The paper discharging rollers 27, the paper discharging tray 22 and the first and second guides 23 and 24 are designed in one unit respectively. Thus, they can be removed from the apparatus, as required.

Further, the apparatus is provided with paper feeding means at the position located downwardly of the paper discharging rollers 27. This paper feeding means is operated when an image is to be transferred onto both surfaces of the paper and comprises a pair of feeding rollers 42 rotatable in both directions and a turnable guide selector 43. The feeding rollers 42 are adapted to displace paper P in the reverse direction after it is brought onto the first guide 23 after image transferrence has been completed to the one surface of paper P. The guide selector 43 serves for two functions, one of them being to guide to the feeding rollers 42 paper P to which one surface image transferrence has been completed and the other one being to guide to the platen 10 the rear end part of the aforesaid paper P to be displaced in the reverse direction.

Figure 8:
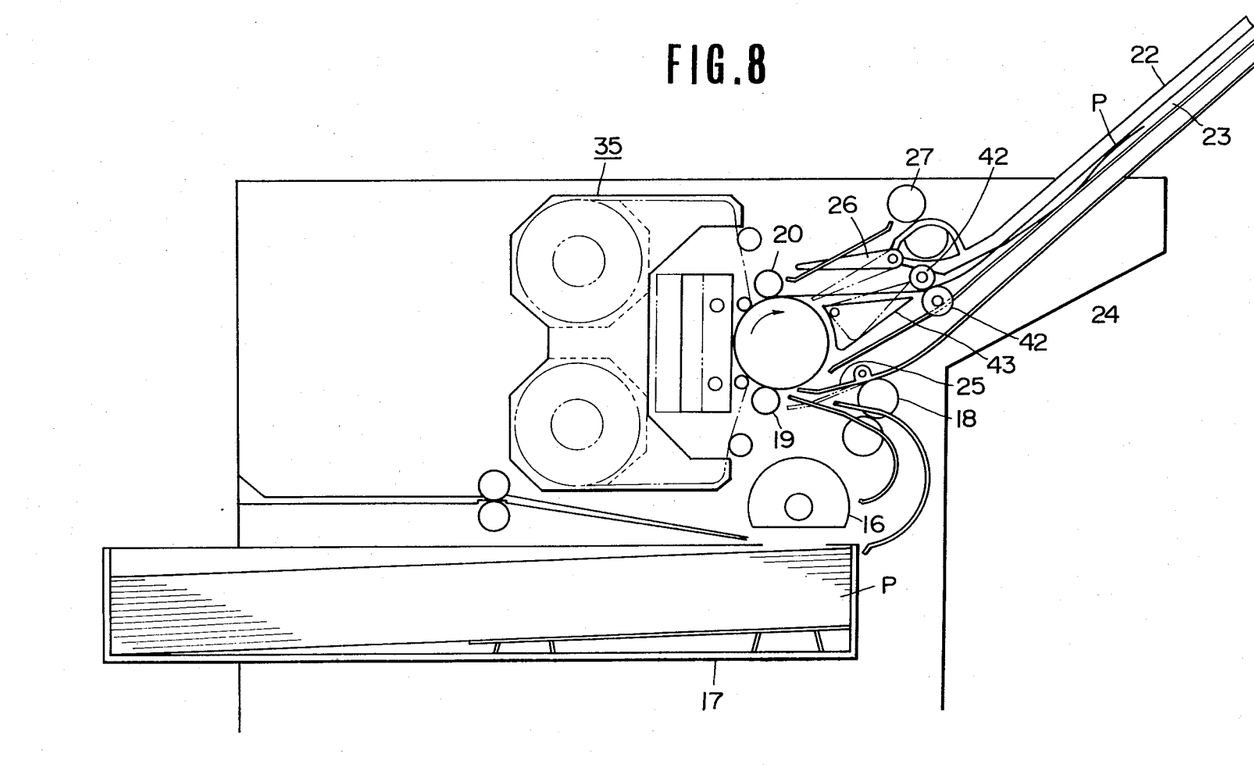
FIGS. 8 and 9 are schematic vertical sectional views of the apparatus illustrating how paper is displaced in the apparatus when image transferrence should be carried out to both the surfaces of paper.
Figure 9:
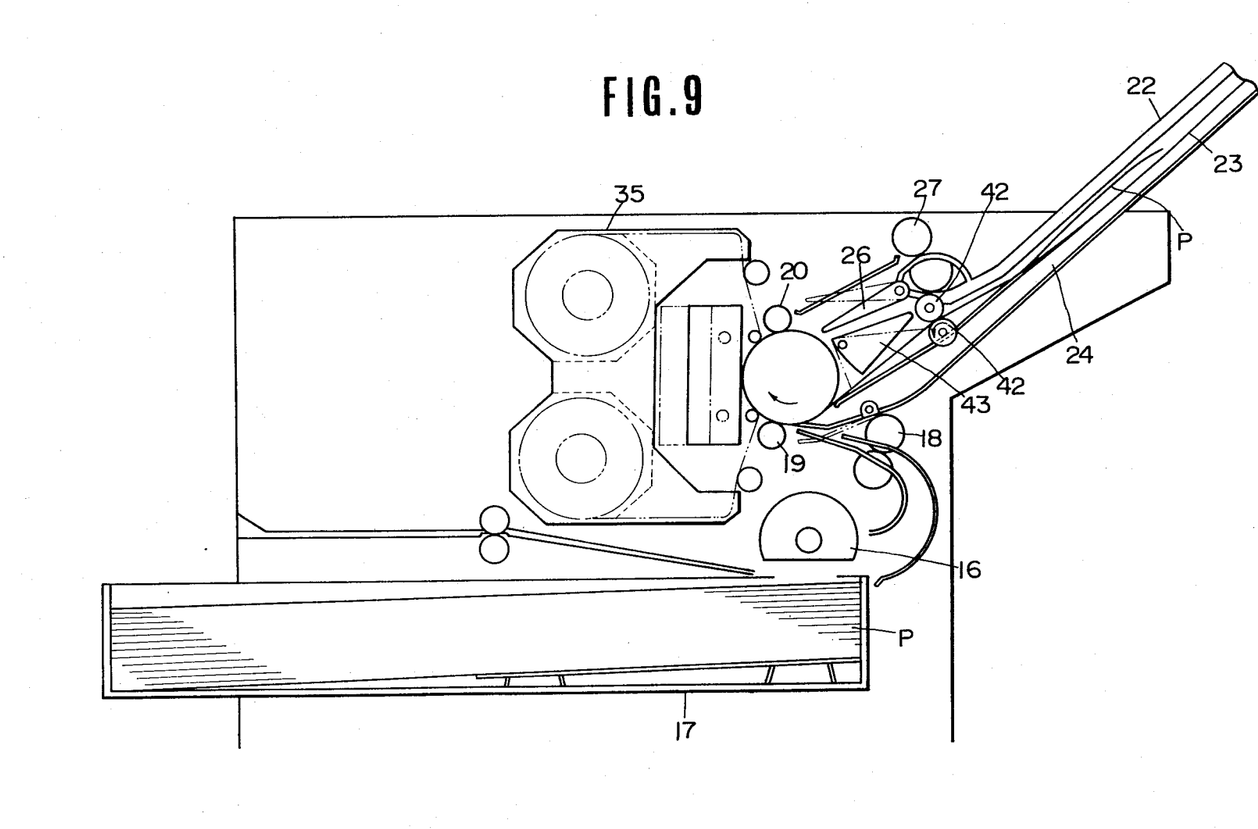

When image transferrence should be effected on both surfaces of the paper, the second distributin guide 26 and the guide selector 43 are turned to the positions as identified by real lines in FIG. 8 and paper P, an one surface of which image transferrence has been completed, is brought to the feeding rollers 42. Then, it is displaced further (toward the upper right-hand portion of FIG. 8) until its rear end (lower left-hand edge in FIG. 8) is parted away from the guide selector 43. Thereafter, the second distributing guide 26 and the guide selector 43 are turned to the position as identified by real lines in FIG. 9 (double-dashed lines in FIG. 8), and the feeding rollers 42 are rotated in the reverse direction to displace the rear end of paper P toward the lower part of the platen 10. When paper P is delivered to the image transferring section, the platen 10 initiates its paper feeding operation while paper P assumes the upset posture. Thus, image transferring is effected to the reverse surface of paper P. On completion of image transferrence to the reverse surface of paper P, the latter is displaced toward the paper discharging rollers 27 as the platen 10 is rotated and it is then discharged onto the paper discharging tray 22 as the paper discharging rollers 27 are rotated.

Incidentally, when superimposing image transferrence should be repeatedly carried out to the reverse surface of paper P, the latter is caused to reciprocably move between the first and second guides 23 and 24 in the same manner as illustrated in FIGS. 6 (A) to (D).

While the present invention has been described above with respect to a single preferred embodiment, it should of course be understood that it should not be limited only to this but various changes or modifications may be made in any acceptable manner without departure from the spirit and scope of the invention.

What is claimed is:
1. An image building apparatus for transferring an image in a superimposed manner onto first and second faces of a sheet-shaped printing medium having a leading end and a trailing end, said apparatus comprising:
   image transfer means for transferring a printing agent onto said printing medium when said printing medium moves through said image transfer means in a forward direction;
   first guiding means;
   second guiding means disposed parallel to said first guiding means;
   a discharging tray;
   first feeding means for feeding said printing medium to said image transfer means with said leading end of said printing medium in said forward direction to permit transfer of said printing agent to said first face of said printing medium;
   conveying means for reciprocating said printing medium fed to said image transfer means between said first and second guiding means a plurality of times through said image transfer means, said printing medium being reciprocated from said second guiding means to said first guiding means in said forward direction and from said first guiding means to said second guiding means in a reverse direction, said first face of said printing medium having said printing agent transferred thereto when said leading end of said printing medium is conveyed through said image transger means in said forward direction, and said second face of said printing medium having said printing agent transferred thereto when said trailing end of said printing medium is conveyed through said image transfer means in said forward direction; and
   second feeding means for feeding said printing medium from said first guiding means to said image transfer means with said trailing end of said printing medium in said forward direction to permit transfer of said printing agent to said second face of said printing medium.

2. The image building apparatus as defined in claim 1, wherein said second feeding means includes guide selector means for selectively guiding said trailing edge of said printing medium from said first guiding means to said image transfer means in said forward direction to permit transfer of said printing agent to said second face of said printing medium.

3. The image building apparatus as defined in claim 2, wherein said guide selector means includes a guide selector pivotable between a first position and a second position, said guide selector in said first position permitting said printing medium to move from said first guiding means to said image transfer means in said reverse direction, and said guide selector in said second position guiding said printing medium from said first guiding means to said image transfer means in said foward direction.

4. The image building apparatus as defined in claim 1, wherein said first and second guiding means extend parallel to said discharging tray.

5. The image building apparatus as defined in claim 4, further comprising a housing and wherein said first guiding means, said second guiding means, and said discharging tray are attachable to and removable from said housing in union.

6. The image building apparatus as defined in claim 1, wherein said image transfer means includes a platen and a recording head displaceable relative to said platen to come in contact or out of contact with said platen while said printing medium is interposed therebetween.

7. The image building apparatus as defined in claim 6, wherein said recording head is a thermal head.

8. The image building apparatus as defined in claim 6, wherein said platen includes a rotatable roller portion.

9. The image building apparatus as defined in claim 1, wherein said printing agent includes a plurality of coloring agents.

10. An image building method for transferring a plurality of coloring agents in a superimposed manner onto first and second faces of a sheet-shaped printing medium having a leading end and a trailing end, said method comprising the steps of:

feeding one sheet of said printing medium from a printing medium feeding tray onto a first guide with said leading end in a forward direction via an image transfer mechanism and transferring the first one of said coloring agents onto said first face of said printing medium;

reciprocating said printing medium between said first guide and a second guide a plurality of times via said image transfer mechanism with said leading end in said forward direction and transferring one of said coloring agents other than said first coloring agent onto said first face of said printing medium in a superimposed manner each time said printing medium moves in said forward direction from said second guide to said first guide;

feeding said printing medium from said first guide to said image transfer mechanism with said trailing end in said forward direction;

reciprocating said printing medium between said first guide and said second guide a plurality of times via said image transfer mechanism with said trailing end in said forward direction and transferring one of said coloring agents other than the last one of said coloring agents onto said second face of said printing medium in a superimposed manner each time said printing medium moves in said forward direction from said second guide to said first guide; and conveying said printing medium from said second guide onto a discharging tray via said image transfer mechanism and transferring said last coloring agent onto said second face of said printing medium.

* * * * *